US006874733B2

United States Patent
Wood

(10) Patent No.: US 6,874,733 B2
(45) Date of Patent: Apr. 5, 2005

(54) ATTACHMENT APPARATUS FOR INJECTED-MOLDED FRAMELESS CANOPIES

(75) Inventor: Jeffrey H. Wood, Eureka, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/367,062

(22) Filed: Feb. 13, 2003

(65) Prior Publication Data

US 2004/0159744 A1 Aug. 19, 2004

(51) Int. Cl.⁷ .................................................. B64C 1/14
(52) U.S. Cl. .............................. 244/129.3; 244/129.4; 244/129.5
(58) Field of Search .......................... 244/121, 129.3, 244/129.4, 129.5; 292/32, 35, 42, 137, 162, DIG. 7, DIG. 20, DIG. 47, 201, 216, DIG. 23

(56) References Cited

U.S. PATENT DOCUMENTS

| | | |
|---|---|---|
| 451 A | 11/1837 | Salsbury, Jr. |
| 2,258,724 A | 10/1941 | Wagner et al. |
| 2,511,168 A | 6/1950 | Martin et al. |
| 3,618,881 A | 11/1971 | Fellers et al. |
| 3,768,759 A * | 10/1973 | Martin ........................ 244/121 |
| 3,885,761 A * | 5/1975 | Pendergast et al. .......... 244/121 |
| 4,004,388 A | 1/1977 | Stefanik |
| 4,473,201 A * | 9/1984 | Barnes et al. ............. 244/129.5 |
| 4,497,462 A * | 2/1985 | Hamatani ................ 244/129.5 |
| 4,510,714 A * | 4/1985 | Kasper et al. ................ 49/249 |
| 4,580,745 A | 4/1986 | Brophy |
| H000451 H * | 4/1988 | Pinnell ........................ 244/121 |
| 4,869,446 A * | 9/1989 | Hubert et al. ............... 244/121 |
| 5,031,863 A * | 7/1991 | Noble ...................... 244/129.5 |
| 5,085,383 A | 2/1992 | Larkin et al. |
| 6,279,971 B1 * | 8/2001 | Dessenberger, Jr. ......... 292/113 |
| 6,341,748 B1 * | 1/2002 | Brooks et al. ........... 244/129.5 |
| 6,457,675 B1 * | 10/2002 | Plude et al. ............. 244/129.5 |
| 6,633,239 B2 * | 10/2003 | Plude et al. ................ 340/945 |

* cited by examiner

Primary Examiner—Teri P. Luu
Assistant Examiner—T. Nguyen
(74) Attorney, Agent, or Firm—Black Lowe & Graham PLLC

(57) ABSTRACT

A latching system and method for a canopy are provided. Devices are partially embedded in the canopy and latches are slideably received within a canopy rail of the vehicle. The latches are controlled by a latch controller and lock the canopy to the vehicle. A canopy position sensor senses the position of the canopy, and a canopy controller controls the position of the canopy. The latch controllers control the position of the one or more latches based on the sensed position of the canopy or the status of the canopy controller. A latch position sensor senses the position of the latches and a vehicle position sensor senses the position of the vehicle. The canopy controller controls the position of the canopy based on the sensed position of the latches and the sensed position of the vehicle.

12 Claims, 4 Drawing Sheets

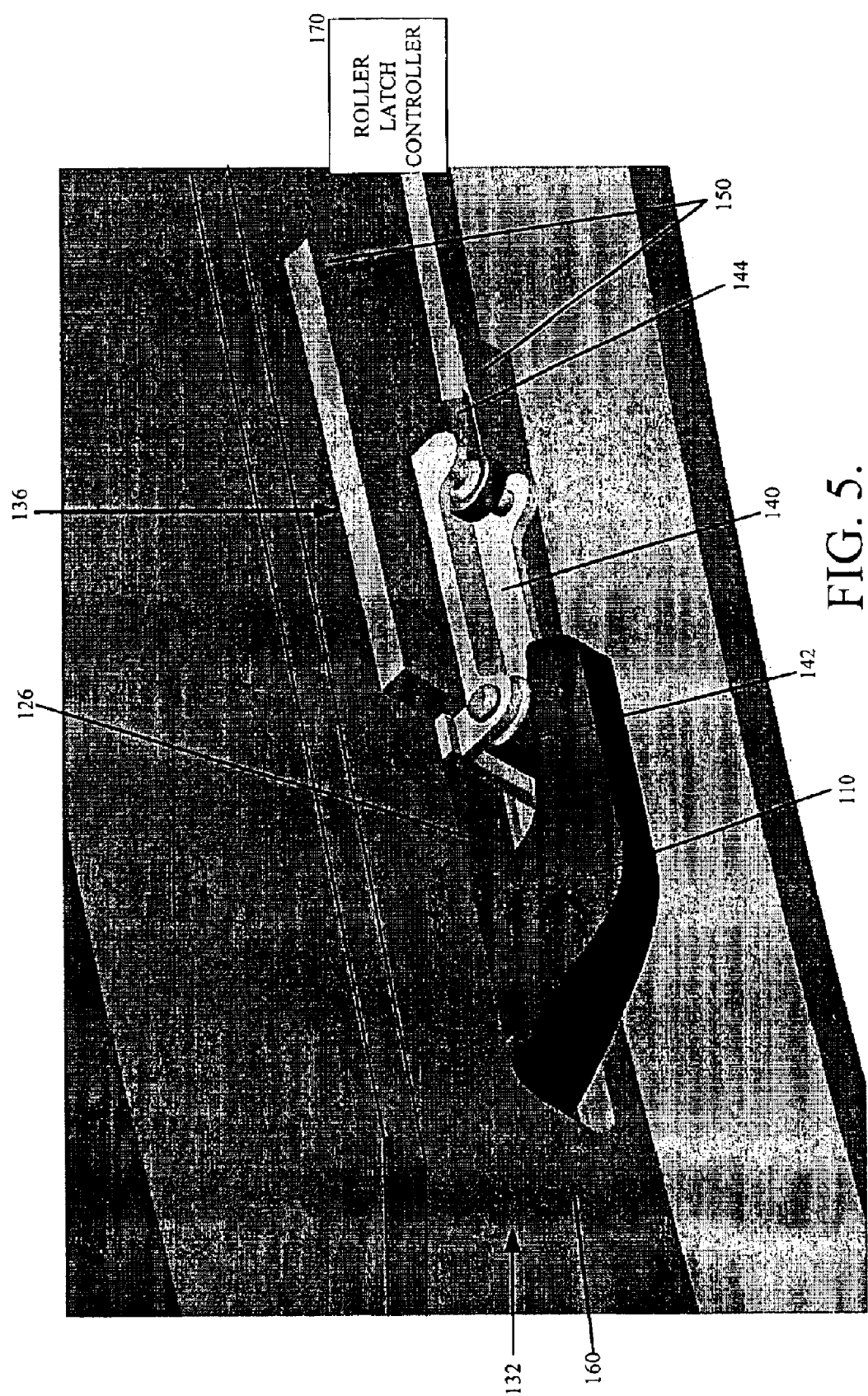

ATTACHMENT APPARATUS FOR INJECTED-MOLDED FRAMELESS CANOPIES

RELATED APPLICATIONS

This invention relations to copending U.S. patent application Ser. No. 10/366,949, filed Feb. 13, 2003, U.S. patent application Ser. No. 10/367,024, filed Feb. 13, 2003, U.S. patent application Ser. No. 10/367,064, filed Feb. 13, 2003, U.S. patent application Ser. No. 10/367,404, filed Feb. 13, 2003, U.S. patent application Ser. No. 10/367,403, filed Feb. 13, 2003, all of which are hereby incorporated by reference.

GOVERNMENT LICENSE RIGHTS

This invention was made with Government support under U.S. Government contract F33615-97-2-3407 awarded by the U.S. Air Force. The Government has certain rights in this invention.

FIELD OF THE INVENTION

This invention relates generally to canopies and, more specifically, to attachment mechanisms for frameless canopies.

BACKGROUND OF THE INVENTION

Modern aircraft canopies contain many parts. A transparent portion of the canopy may be replaced several times during the life of an aircraft due to scratches and general deterioration. Replacement of the transparent portion entails frame disassembly and reassembly. This is time-consuming, labor intensive, and costly.

Attempts have been made to produce frameless aircraft canopies in order to simplify replacement of the transparent portion. However, a frame provides structural stiffness and strong, secure, attachment points for hinges and latches. As is known, a viable frameless canopy system must include a method for latching. Prior latching methods include a male hook or pin located on the aircraft structure or canopy frame and a female receiver on the canopy frame structure or aircraft structure respectively. Such discrete latching methods produce concentrated loads, which cause bearing stress in the transparency in the region of the latch.

Stress causes problems for transparencies. Glassy polymers craze at low stress levels. The effects of crazing on crack growth and localized failure are not well understood. Polymer transparencies yield at low stress levels and creep occurs after a fraction of service life. Cyclic, long-term loading, such as cockpit pressurization, induces creep and/or craze and reduces service life. Elevated temperatures, such as those experienced by high-speed aircraft, further increase the rate of creep and amplify the effect of crazing.

Therefore, there exists an unmet need to produce a latching system for an injection-molded canopy, which avoids plastic creep and crazing due to concentrated loads yet securely holds the canopy in place.

SUMMARY OF THE INVENTION

The present invention provides a latching system and method for latching a canopy, such as an injection-molded canopy, which avoids plastic creep and crazing due to concentrated loads. The system includes devices that are partially embedded in the canopy, latches that are slideably received within a canopy rail of the vehicle, and a latch controller. The latches make contact with the devices and lock the canopy to the vehicle. The latch controller controls the position of the latches.

In one aspect of the invention, the system includes a canopy position sensor that senses the position of the canopy, and a canopy controller that controls the position of the canopy. The latch controllers control the position of the one or more latches based on the sensed position of the canopy or the status or position of the canopy controller.

In another aspect of the invention, the system includes a latch position sensor that senses the position of the latches and a vehicle position sensor for sensing the position of the vehicle. The canopy controller controls the position of the canopy based on the sensed position of the latches and the sensed position of the vehicle.

In still another aspect of the invention, the system includes a seal that is received within the canopy rail, and a sealing component that inflates the one or more seals based upon the sensed position of the canopy.

In yet another aspect of the invention, the canopy is an injection-molded canopy and the devices are hooks.

BRIEF DESCRIPTION OF THE DRAWINGS

The preferred and alternative embodiments of the present invention are described in detail below with reference to the following drawings.

FIG. 5 illustrates a partial perspective view of the portion of the canopy of FIG. 4 in a closed and locked position in the canopy rail.

DETAILED DESCRIPTION OF THE INVENTION

The present invention is a system and method for securely attaching a canopy to a vehicle, such as an aircraft. The present invention allows for locking of canopies that include hook assemblies that are attached to the canopy or are imbedded in an injection-molded canopy, such as that described in U.S. patent application Ser. No. 10/367,064, filed 2003, which is hereby incorporated by reference.

Figure 1:
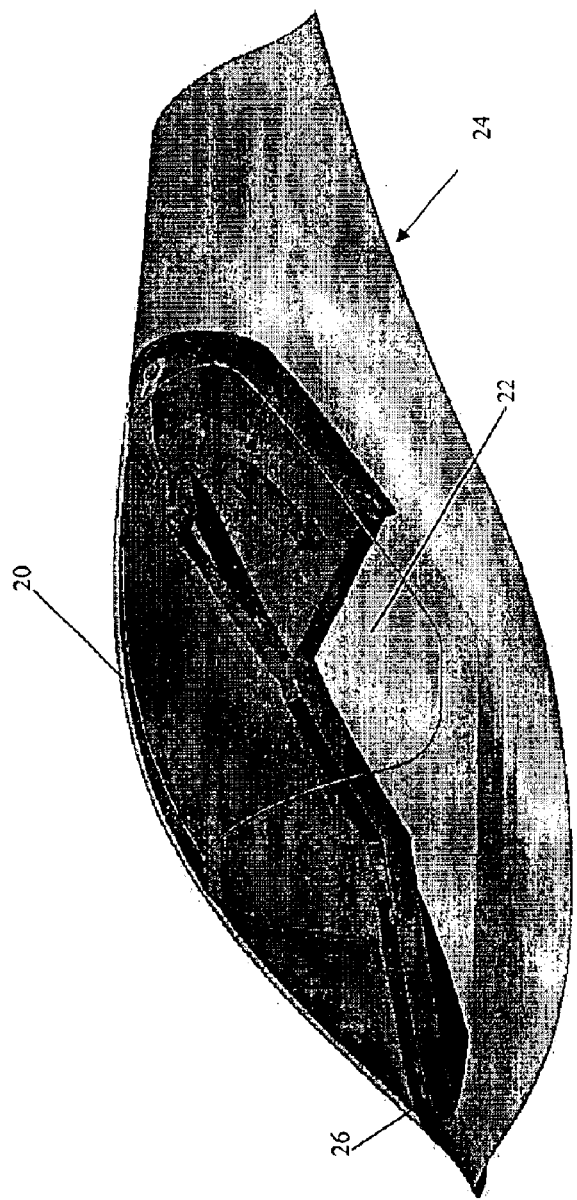
FIG. 1 illustrates a perspective view of a canopy connected to a vehicle in accordance with the present invention.

As shown in FIG. 1, a canopy 20 surrounds a cockpit 22 of a vehicle 24. Surrounding the cockpit 22 is a canopy rail 26 that includes mechanisms for locking the canopy 20 to the cockpit 22 and for providing a moisture and air pressure seal between the cockpit 22 and the environment outside of the cockpit 22.

Figure 2:
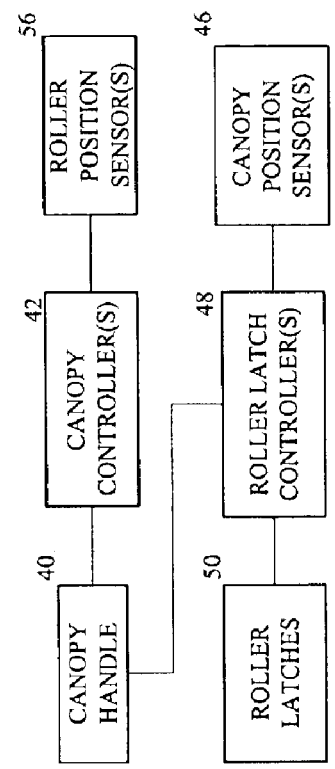
FIG. 2 illustrates a block diagram of components of the present invention.

FIG. 2 is a block diagram of a system 30 for attaching the canopy 20. The system 30 includes a canopy handle 40, a canopy controller 42, one or more canopy position sensors 46, one or more roller latch controllers 48, one or more roller latches 50, and one or more roller position sensors 56. The canopy handle 40 is electrically or mechanically coupled to the canopy controller 42. The canopy controller 42 controls the position of the canopy 20. The canopy position sensors 46 indicate whether the canopy 20 is sensed in an open or closed position. The roller latch controller 48 controls the position of the roller latches 50 based on the position of the canopy handle 40 and the sensed position of the canopy 20.

The operation of the system 30 is as follows. When the canopy 20 is in the open position, the roller latch controller 48 positions the roller latches 50 in an open receiving position. Once the pilot has activated the canopy handle 40 to a closed position, the canopy controller 42 moves the canopy 20 into a closed position about a canopy rail 26. When the canopy position sensors 46 sense that the canopy 20 is in a closed position, the roller latch controller 48 moves the roller latches 50 into a closed and locked position. When the canopy 20 is in the closed and locked position and the canopy handle 40 has been moved to an open position (provided the vehicle 24 is within predefined limits for opening the canopy, such as without limitation the vehicle 24 is an aircraft and is on the ground below a certain ground speed) the roller latch controller 48 moves the roller latches 50 into an open position. After the roller position sensor 56 sense that the roller latches 50 are in the open position, the canopy controller 42 opens the canopy 20.

Figure 3:
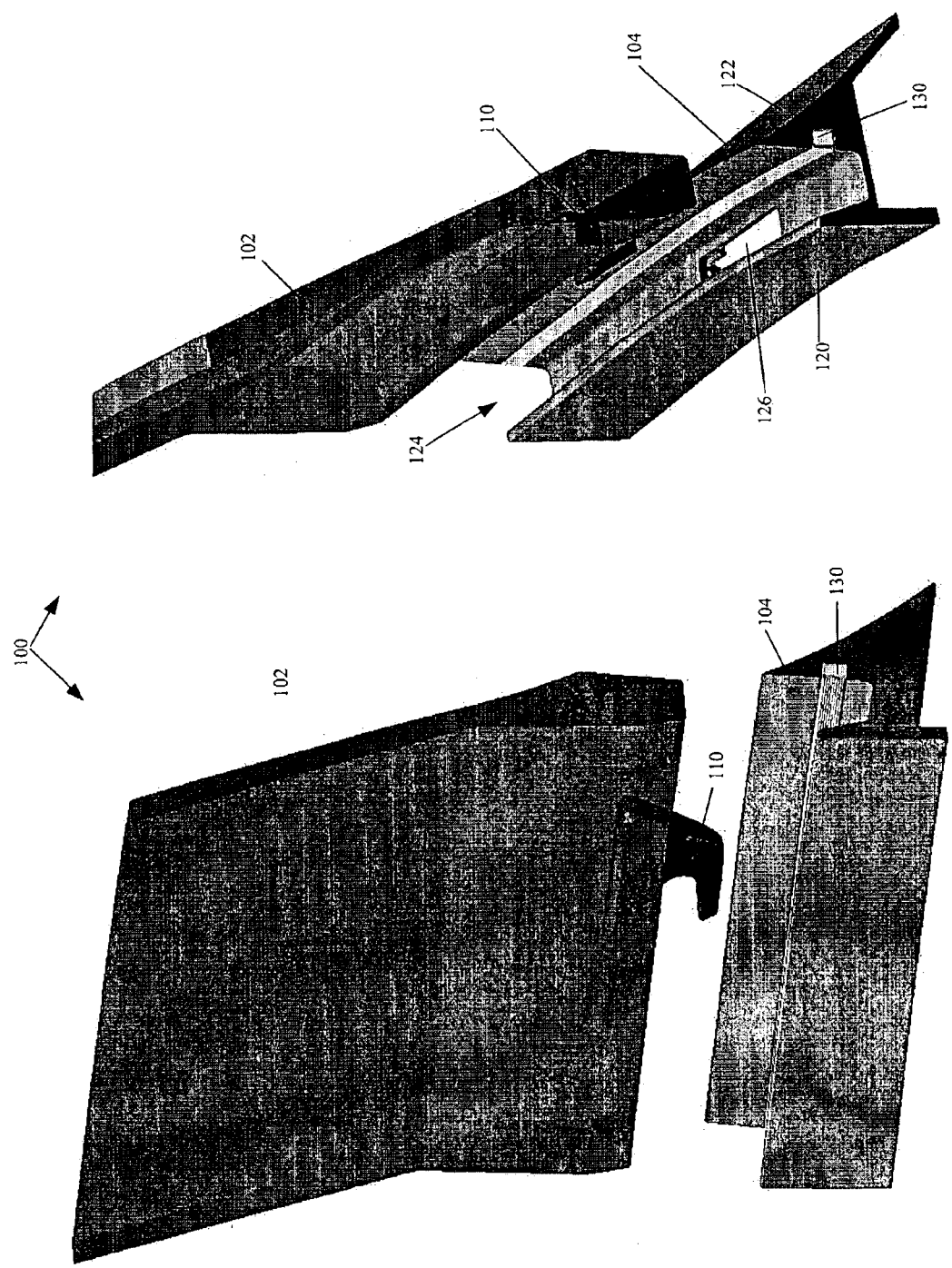
FIGS. 3A and 3B illustrate partial perspective views of a canopy and canopy rail formed in accordance with the present invention.

FIGS. 3A and 3B illustrate a non-limiting example of a canopy and rail attachment system 100 formed in accordance with the present invention. The system 100 includes a canopy 102 and a canopy rail 104. The canopy 102 includes a hook (or bayonet) device 110 that is mechanically attached to the canopy 102 or is injection-molded into the canopy 102, such as a polycarbonate or acrylic canopy. The hook device 110 is exposed at the base of the canopy 102.

The canopy rail 104 has a substantially H-shaped cross-section with an interior wall 120 and an exterior wall 122. The interior wall 120 and the exterior wall 122 form a first channel 124 that is configured to receive the canopy 102. The base of the first channel 124 includes a hook-receiving opening 126 that receives the hook device 110 when the canopy 102 is placed within the first channel 124. Along one of the walls of the first channel 124 an inflatable seal 130 is embedded. When the canopy 102 is in a closed position within the first channel 124, the inflatable seal 130 is inflated to create a water and air pressure seal between the canopy rail 104 and the canopy 102. The inflatable seal 130 is coupled to a pneumatic or hydraulic system (not shown) that is located within the vehicle. The canopy rail 104 is shaped along its base to be attached in the conventional manner around the edge of a canopy 102.

Figure 4:
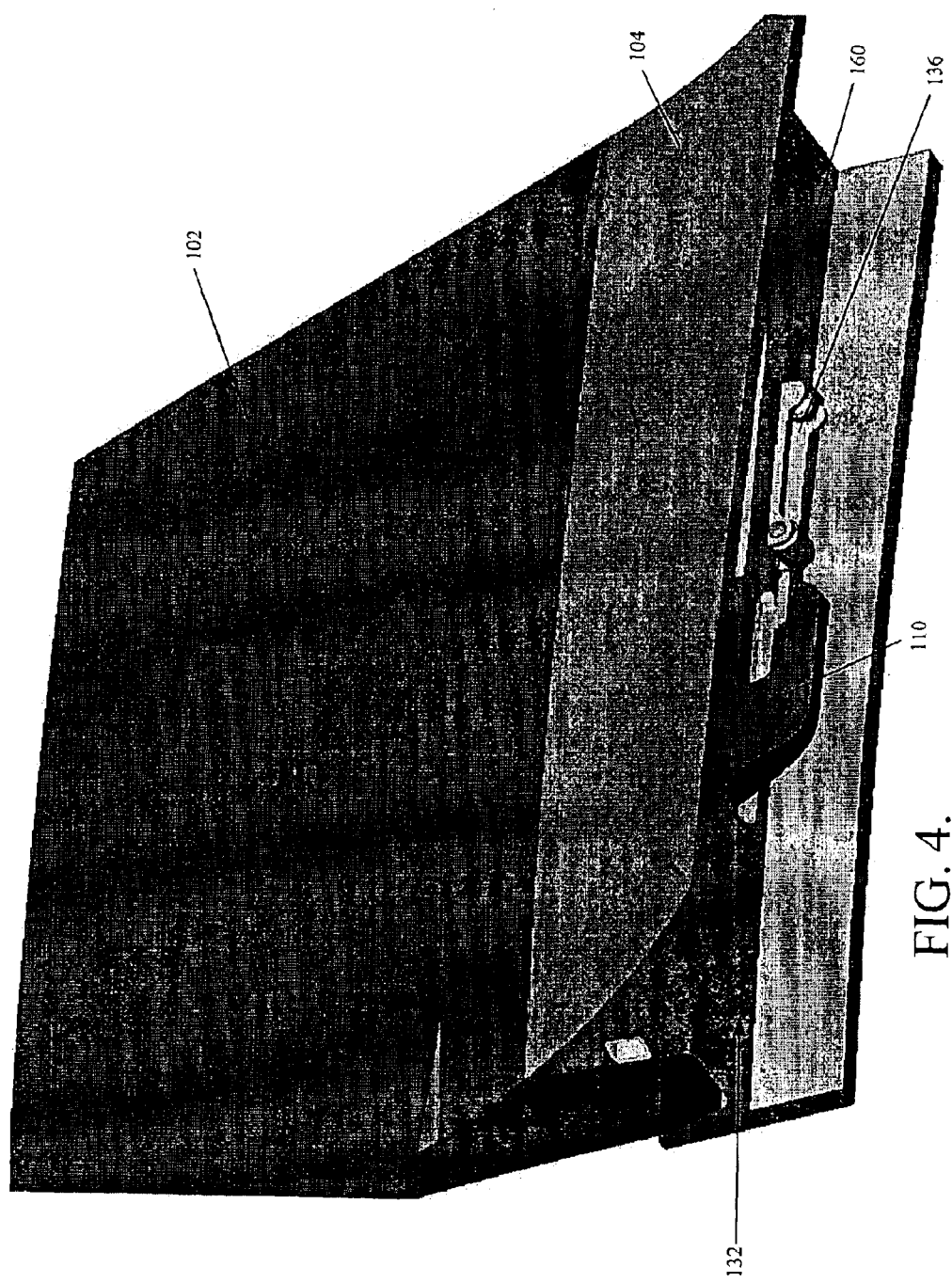
FIG. 4 illustrates a partial perspective view of a portion of a canopy in closed, unlocked position in a canopy rail.

FIG. 4 illustrates the canopy 102 in the closed position within the first channel 124 of the canopy rail 104. The hook device 110 protrudes into a second channel 132 that is opposite the first channel 124 and formed by the interior wall 120 and the exterior wall 122. The system 100 also includes a roller latch assembly 136 that is attached to a base wall 160 that is formed by the interior and exterior walls 120 and 122 in the second channel 132.

FIG. 5 illustrates the roller latch assembly 136 in a closed and locked position. The roller latch assembly 136 includes a carriage 140, a roller 142, and an actuator arm 144. The carriage 140 is slideably received by blocks 150 that are attached to the base wall 160. The blocks 150 are located adjacent to the hook-receiving opening 126 and opposite the direction of which the hook device 110 opens, thereby allowing the carriage 140 to slide toward the opening of the hook device 110. The roller 142 is rotatably attached to a first end of the carriage 140 such that when the carriage 140 is slid toward the horseshoe opening of the hook device 110 the roller 142 makes contact with an inside wall of the hook device 110. The pressure that the roller 142 places on the hook device 110 locks the canopy 102 to the canopy rail 104. It will be appreciated that the carriage 140 can lock to devices that extend from the canopy 102 other than the hook device 110, such as without limitation a handle. It will further be appreciated that various types of sliding, locking devices can be used in place of the carriage 140 and various mechanisms can connect the sliding, locking devices to the canopy rail.

The actuator arm 144 is attached to a second end of the carriage 140 and to a roller latch controller 170. The roller latch controller 170 controls the location of the carriage 140. The roller latch controller 170 is suitably a hydraulic device, but could be one of a number of different types of pneumatic or electromechanical devices.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for locking a canopy to a vehicle, the system comprising:

one or more devices attached to the canopy;

one or more latches slideably received within a canopy rail of the vehicle for making contact with the one or more devices and locking the canopy to the vehicle;

one or more latch controllers for controlling position of the one or more latches;

a canopy position sensor for sensing the position of the canopy;

a canopy controller for controlling position of the canopy;

one or more latch position sensors for sensing the position of the one or more latches; and a vehicle position sensor for sensing the position of the vehicle, wherein the one or more latch controllers control the position of the one or more latches based on at least one of the sensed position of the canopy or the status of the canopy controller, wherein the canopy controller controls the position of the canopy based on the sensed position of the one or more latches and the sensed position of the vehicle.

2. The system of claim 1, further comprising:

one or more seals received within the canopy rail; and a sealing component for inflating the one or more seals based upon the sensed position of the canopy.

3. The system of claim 2, wherein the sealing component inflates the one or more seals with one of a liquid or gas when the canopy is sensed in a closed position.

4. The system of claim 1, wherein the vehicle is an aircraft and the vehicle position sensor senses when the aircraft is on the ground.

5. The system of claim 1, wherein the one or more devices are hooks.

6. The system of claim 1, wherein the canopy is an injection-molded canopy and the one or more devices are at least partially embedded in the injection-molded canopy.

7. A method for locking a canopy to a vehicle, the method comprising:

providing one or more latches that are slideably received within a canopy rail of the vehicle;

locking the canopy to the vehicle by sliding the one or more latches to make contact with one or more devices coupled to the canopy;

controlling position of the one or more latches;

controlling position of the canopy by a canopy controller;

sensing the position of the canopy;

sensing the position of the one or more latches; and sensing the position of the vehicle, wherein controlling the position of the one or more latches is based on at least one of the sensed position of the canopy or the status of the canopy controller and wherein controlling position of the canopy is based on the sensed position of the one or more latches and the sensed position of the vehicle.

8. The method of claim 7, further comprising:

providing one or more seals within the canopy rail; and inflating the one or more seals based upon the sensed position of the canopy.

9. The system of claim 8, wherein inflating the one or more seals inflates the one or more seals with one of a liquid or gas when the canopy is sensed in a closed position.

10. The method of claim 7, wherein the vehicle is an aircraft and sensing the position of the vehicle senses when the aircraft is on the ground.

11. The method of claim 7, wherein the one or more devices are hooks.

12. The method of claim 7, wherein the canopy is an injection-molded canopy and the one or more devices are at least partially embedded in the injection-molded canopy.

* * * * *